March 8, 1960 L. B. SIMON 2,927,824
WHEEL COVER
Filed Sept. 1, 1955
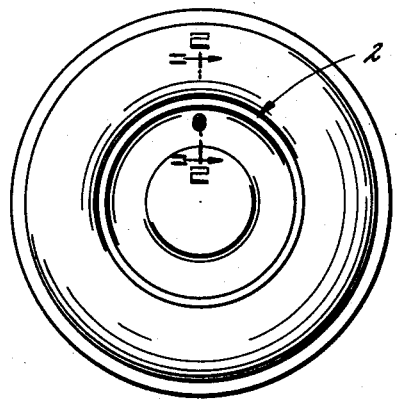
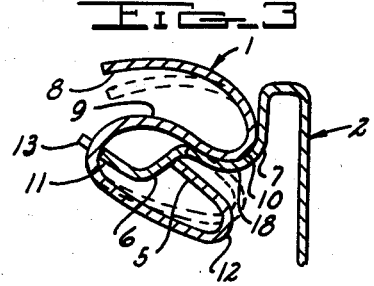
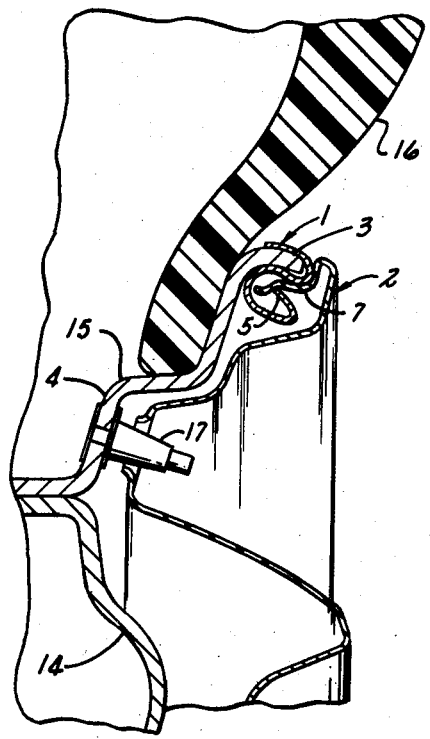
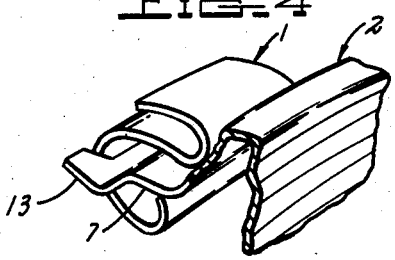
INVENTOR
LEWIS B. SIMON
KOTTS & SHERIDAN
ATTORNEYS

United States Patent Office

2,927,824
Patented Mar. 8, 1960

2,927,824

WHEEL COVER

Lewis B. Simon, Dearborn Township, Mich.

Application September 1, 1955, Serial No. 532,016

3 Claims. (Cl. 301—37)

The invention relates to a wheel structure of the automotive type and more particularly to a novel decorative and protective cover for the wheel and novel attaching devices or clips which cooperate with the wheel rim and cover to hold the cover securely in place and yet allow it to be readily removed when it is desirable to do so.

There are many advantages inherent in the novel clips and wheel cover. A major advantage is that the clips are made of a resilient material such as spring steel which by means of the force generated by bending them from their free shape to hold the cover to the wheel structure develop a force holding the cover in position. This allows fabrication of the cover itself from a cheaper non-resilient material such as aluminum or cold rolled steel or any other material desired in place of the more expensive resilient stainless steel which is now widely used in the art.

Another advantage is in the appearance of the cover which due to the novel method of attachment covers not only the wheel but also the entire rim including the unsightly wheel weights which are frequently attached thereto. At present in the art, the rim is usually left exposed because the method of attachment usually employed makes it costly or impractical to cover. A third advantage is that since the attachment cooperates only with the novel rim of the cover, the designer is free to form any design he desires on the balance of the cover without interfering with the operation of the attaching clips. Another advantage is that the novel clips and cover will withstand the drop test which is used in the industry to test the effectiveness of the attachment. In the drop test, weights are attached to the wheel cover and the wheel and cover assembly are dropped a specified distance. The reasons why these clips and cover will maintain attachment is explained below. Another test employed in the industry is the turntable test wherein a vehicle is driven in a small diameter circle at maximum speed. This causes distortion in the shape of the wheel and rim, causing most covers now used in the art to fall off. My novel cover and clips will resist this test as will be explained below. A sixth advantage is that my invention incorporates a novel means to prevent the cover from rotating with reference to the wheel structure. Most of the covers in the present art rotate on the wheel structure and this action bends the tire air valve. This bending is dangerous in that it may cause a flat tire. Another advantage of covering the rims is that the vehicle manufacturer may paint the wheel structure any color or one color or just a primer coat and thereby save cost in paint and scheduling certain color wheels to be mounted on corresponding color vehicles. Another advantage is that while the cover is easy to remove for repairs, the clips are less easy to remove and consequently my invention will act as a deterrent to theft of wheel covers. A ninth advantage is that with my invention the air valve is readily accessible for tire inflation. A tenth advantage is that provisions are incorporated to eliminate squeaks and rattles.

The objects and features will more fully appear from the following detailed description taken in connection with the accompanying drawings which illustrate one embodiment thereof and in which:

Fig. 1 is a side elevation of a wheel assembly having a wheel cover affixed thereto by the structure of the present invention.

Fig. 2 is an enlarged fragmentary sectional view taken on line II—II of Fig. 1, in the direction of the arrows.

Fig. 3 is an enlarged end elevation of the clip and showing a fragment of the wheel cover and finger affixed to the clip, the free shape of the clip being shown in phantom.

Fig. 4 is a perspective view of the parts shown in Fig. 3.

Figure 2 of the drawings shows the attaching device 1 gripping the rim lip 3 of the wheel structure 4 and clip end 5 pressing against shoulder 6 of wheel cover rim part 7 thereby holding the cover in place. The elements of the wheel and cover structures are annular, so that with the exception of the valve stem and the rim part 7 which may be either annular or a plurality of tabs spaced around the rim, the section of Figure 2 would be the same along any radius of the wheel.

Figure 3 of the drawings shows clip 1 and a fragment of wheel cover 2 with broken lines indicating the shape of clip 1 when it is permitted to assume its original shape before applying it to the wheel rim. Parts 8 and 9 are the parts between which the rim lip 3 is gripped by the clip 1. Rounded portions 10 and 12 are the parts of the clip between which end 11 of rim part 7 is inserted when cover 2 is applied to the wheel structure with clips already applied thereto.

It is to be understood that the embodiment shown herein is for illustrative purposes and may be changed or modified without departing from the spirit and scope of the invention as set forth in the appended claims.

As shown in Figure 2 a typical automotive wheel structure 4 is generally composed of wheel 14, an attached rim 15, a tire 16 and a protruding valve stem 17. Also shown in Figure 2 is my basic invention, a novel clip 1 and a novel cover 2. The clip which is made of a resilient material such as spring steel is firmly clamped to the rim lip 3 by prying the part 8 away from part 9 and pushing the clip into the position shown in Figure 2. This method of attaching a clip to a wheel rim is well known in the art, having been used for many years to attach wheel balancing weights to rims. What now follows is my invention.

When the clips are affixed to the rim as outlined above, the novel wheel cover is brought up to it in such a manner that the end 11 of the rim part 7 is centered between the rounded parts 10 and 12 of the clips 1 and then the cover is firmly pushed against the clips. The rim part in being forced against the clips forces the rounded parts 10 and 12 from the position shown in broken lines in Fig. 3 allowing entry of the rim part.

The other part of my invention is the novel wheel cover 2. The novel part is the shape of the rim of the cover 2 as shown clearly in Figure 3. The rim part or parts are so shaped that when the cover is in attached position the portion 12 of the clip 1 is held away from its free position as shown by broken lines. This flexing or distortion of the clip generates or creates a force applied by clip end 5 against rim part shoulder 6 to hold the cover firmly on the wheel structure. The clip 2 may be coated or covered with an insulating material such as rubber to serve to deaden or prevent any squeaks or rattles which might be generated by vibration of the wheel structure. In the case of the drop test as described above when a large force tends to move the cover radially from its position on the wheel, the rounded part 18 of the rim part 7 will press against the rounded part 10 of the clip to prevent movement of the cover from its concentric position on the wheel.

Another feature of my invention relates to the tendency of a wheel cover to rotate with respect to the wheel to which it is attached. My invention prevents this by means of one or more pairs of extensions such as 13 which act to bracket one or more of the clips thereby preventing rotation of the cover.

Wherever the word cover is used it is intended to include any type of decorative cover, ring or other article fixed to the outside of an automotive type wheel structure.

I claim as my invention:

1. In combination, a vehicle wheel having a rim thereon; a clip comprising a narrow resilient strip, said resilient strip having a first arcuate upper wall, a first radial reverse bend spaced from one end thereof forming a nose, a second arcuate wall spaced from said first arcuate wall, a second radial reverse bend, and a third wall to form a generally S shaped configuration, a leg on the third wall positioned adjacent said second wall in the inoperative position, said second wall, third wall and leg forming a hollow finger receiving pocket; the rim of said wheel extending between the first and second walls of said clip; a wheel trim member; and a finger extending axially inward from said wheel trim member near the outer portion thereof and forming a rounded nose seat adjacent the trim member; said finger extending into said finger receiving pocket and displacing said leg, and the nose on said clip engaging the nose seat on said finger.

2. The structure defined in claim 1 wherein the end of the trim member finger is bifurcated to engage the outer longitudinal edges of the clip to prevent rotation of said trim member with respect to said clip.

3. In combination, a vehicle wheel having a rim and rim flange thereon; a clip comprising a narrow resilient strip, said resilient strip having a first arcuate upper wall, a first reverse bend spaced from one end thereof forming a radial nose, a second arcuate wall spaced from said first arcuate wall, said first and said second walls positioning the edge of the wheel rim flange therebetween, the outer edge of said wheel rim flange and the inner surface of the resilient clip being in spaced relationship to permit movement of both first and second arcuate wall sections when a trim assembly is attached thereto, a second reverse bend and a third wall formed to make up a generally S shaped configuration, the radial portion of the second reverse bend engaging a similar section on the wheel rim, said first, second and third walls being of approximately the same length, a leg on the third wall positioned adjacent said second wall, said second wall, third wall and leg forming a hollow finger receiving pocket; a wheel trim member; and a finger extending axially inward from said wheel trim member near the outer portion thereof and forming a rounded nose seat adjacent the trim member; said finger extending into said finger receiving pocket and displacing said leg, and the nose on said clip engaging the nose seat on said finger.

References Cited in the file of this patent

UNITED STATES PATENTS

| | | |
|---|---|---|
| 2,231,948 | Rickey | Feb. 18, 1941 |
| 2,351,655 | Aske | June 20, 1944 |
| 2,485,936 | Stroberg | Oct. 25, 1949 |
| 2,714,041 | Lyon | July 26, 1955 |
| 2,749,186 | Wood | June 5, 1956 |
| 2,774,634 | Lyon | Dec. 18, 1956 |
| 2,804,346 | Landell | Aug. 27, 1957 |